(No Model.) 2 Sheets—Sheet 2.
H. REES.
CORN PLANTER.
No. 603,739. Patented May 10, 1898.
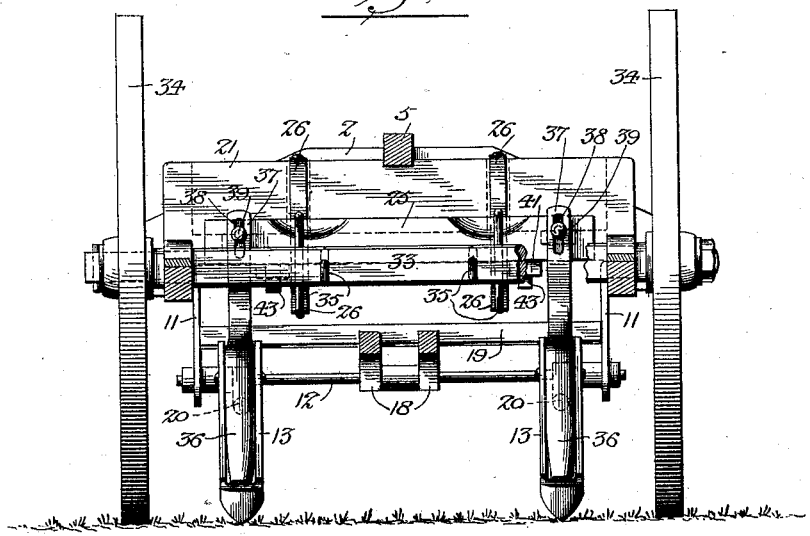
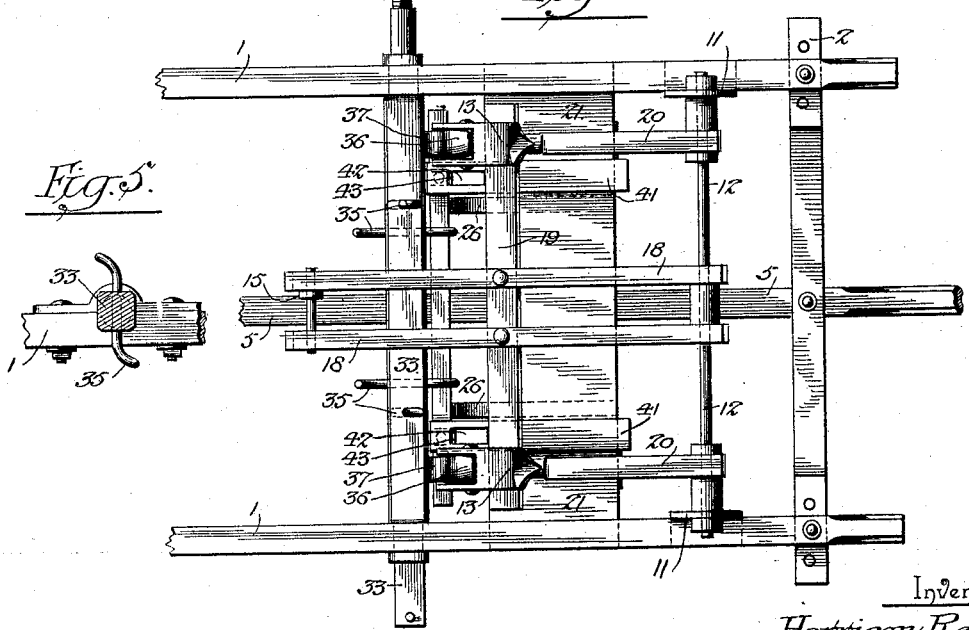
Witnesses:
Louis M. T. Whitehead
V. B. Hillyard
Inventor:—
Harrison Rees
By His Attorneys,
C. A. Snow & Co.

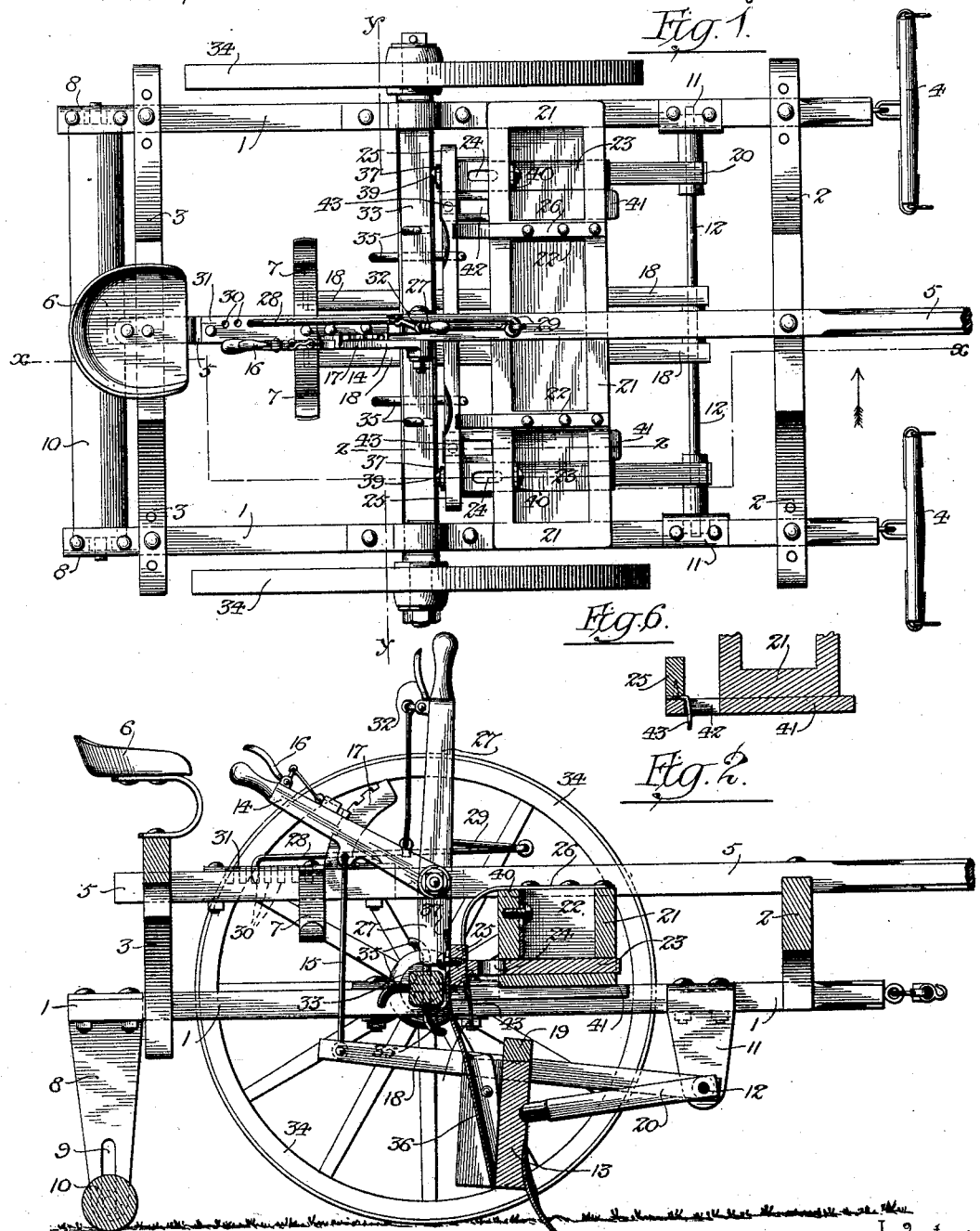

UNITED STATES PATENT OFFICE.

HARRISON REES, OF FARMINGTON, IOWA.

CORN-PLANTER.

SPECIFICATION forming part of Letters Patent No. 603,739, dated May 10, 1898.

Application filed December 9, 1897. Serial No. 661,286. (No model.)

*To all whom it may concern:*

Be it known that I, HARRISON REES, a citizen of the United States, residing at Farmington, in the county of Van Buren and State of Iowa, have invented a new and useful Corn-Planter, of which the following is a specification.

This invention relates to planting machinery, and in common with implements of this character is designed for planting corn in check-rows without requiring the use of the ordinary check cord or line stretched across the field and adapted to operate the seed-dropping mechanism at regular intervals.

For a full understanding of the merits and advantages of the invention reference is to be had to the accompanying drawings and the following description.

The improvement is susceptible of various changes in the form, proportion, and the minor details of construction without departing from the principle or sacrificing any of the advantages thereof, and to a full disclosure of the invention an adaptation thereof is shown in the accompanying drawings, in which—

Figure 1 is a top plan view of a planter constructed in accordance with this invention. Fig. 2 is a longitudinal section on the line X X of Fig. 1, looking in the direction of the arrow. Fig. 3 is a transverse section on the line Y Y of Fig. 1, looking to the front. Fig. 4 is a view of the planter inverted, the ground-wheels being omitted and the rear portion broken away. Fig. 5 is a transverse section of the axle, showing two arms for operating the seed-slides. Fig. 6 is a detail section on the line Z Z of Fig. 1.

Corresponding and like parts are referred to in the following description and indicated in the several views of the accompanying drawings by the same reference characters.

The planter-frame comprises longitudinal bars 1 and front and rear transverse arches 2 and 3, respectively. These arches have adjustable connection with the longitudinal bars, so as to admit of the distance between them being varied and their relative position changed. Singletrees 4 are applied to the front ends of the longitudinal bars 1, and the draft is applied thereto. The pole or tongue 5 is located intermediate of the longitudinal bars 1 and is secured to their connecting-arches. The driver's seat 6 is applied to the rear arch, and a foot-rest 7 is secured to the rear end of the pole or tongue 5. Hangers 8 are pendent from the rear ends of the longitudinal bars 1 and have vertical slots 9, which receive the journals of a roller 10, thereby admitting of the latter moving vertically, so as to adapt itself to the character of the surface over which the planter is traveling, said roller serving to cover the grain, level the ground, and compress the soil sufficiently to insure the seed germinating.

Hangers 11 are pendent from the front ends of the bars 1 and support a transverse rod 12, upon which is pivotally mounted a frame carrying the drills 13. This pivoted frame is adjustable vertically at its rear end by means of a lever 14, which is connected by means of a link 15 therewith and which is provided with the ordinary hand-latch 16 to coöperate with a notched segment 17, whereby the frame and the drills are held at the required elevation. The pivoted frame consists of parallel bars 18, a transverse bar 19, and braces 20, the latter being parallel with the bars 18 and extending from the rod 12 to the drills 13, which latter are secured at their upper ends to the bar 19.

A grain-box 21 extends transversely of the machine and is supported at its ends upon the longitudinal bars 1, to which it is secured, and is subdivided by partitions 22, forming end hoppers. Seed-slides 23 operate over the bottom of the hoppers and are provided with openings 24, which receive the corn or grain and drop the same into the drills. These seed-slides operate through openings in the front and rear walls of the grain-box and are connected to a bar 25, parallel with and in the rear of the grain-box. Springs 26 are secured to the upper edges of the partitions 22, and their rear ends curve downwardly and engage with the transverse bar 25 and serve to move the latter and the seed-slides rearwardly. The rearward movement of the bar 25 and the seed-slides is regulated by an adjustable stop, which in the present instance consists of a lever 27, fulcrumed to the rear portion of the pole or tongue 5 and having its lower end extending across the path of the bar 25, so as to engage therewith and limit its movement. A rod 28, having its rear end hooked or bent, is pivoted at its front end to an arm 29, extending forwardly from the lever 27, and the bent end of the hooked rod is adapted to enter one of a series of openings 30, formed in a plate 31, secured to the top side of the pole or tongue, so as to hold the lever in an adjusted position. A hand-latch 32 of common construction has connection with the hooked rod 28, whereby the latter may be disengaged from the plate 31 when it is required to adjust the lever to regulate the movement of the bar 25, so as to control the amount of seed planted in a hill or throw the seed-dropping mechanism out of action.

The axle 33 is journaled near its ends in bearings provided on the longitudinal bars 1 and is supplied with ground-wheels 34, one of which is mounted loosely upon its spindle and the other secured to the opposite spindle, so as to rotate with the axle and impart movement thereto when the machine is drawn over the field. This axle is provided with tappets 35, which are short arms projecting from the sides of the axle and curving rearwardly, so as to engage with the bar 25 and move it forward against the tension of the springs 26, whereby the openings 24 of the seed-slides 23 communicate with the hoppers and receive a supply of grain, which in the rearward movement of the seed-slides is dropped into the drills or grain-spouts 13, which latter are disposed in vertical alinement with the rear side of the grain-box, so as to receive the grain in its descent from the seed-slides. The number of these tappets 35 will control the distance apart of the hills of corn, the less the number the greater the distance apart of the hills and the greater the number of tappets the less the distance apart of the hills, because the seed-slides will be operated a greater number of times during one revolution of the axle. If the circumference of the ground-wheels is eight feet and two tappets be provided and located at diametrically opposite points, the hills will be four feet apart, and if the number of tappets is four the hills will be two feet apart. It will thus be seen that by varying the number of the tappets the corn may be planted at any required distance apart.

The drills or grain-spouts 13 are closed at their rear sides by flap-valves 36, which are pivoted thereto and are normally closed, and these valves have vertical extensions 37, which are slotted at their upper ends, as shown at 38, to receive headed fastenings 39, let into the transverse bar 25. The slots 38 admit of the vertical adjustment of the drills or grain-spouts, and the fastenings 39 cause the valves to move forward with the bar 25, whereby the valves are opened and the grain dropped into the furrows or trenches formed by the openers attached to the lower ends of the drills. Plates 40 have adjustable connection with the rear side of the grain-box, and their lower ends touch the top sides of the seed-slides, so as to insure a snug fit, thereby preventing the loss or wasting of the grain.

As the machine is drawn over the field the axle is rotated, and the tappets successively engaging with the bar 25 move it and the seed-slides forward, and as the tappets escape from the bar 25 the latter moves rearwardly under the action of the springs 26. By pulling back upon the lever 27 the bar 25 can be thrown beyond the reach of the tappets, thereby throwing the seed-dropping mechanism out of gear, whereby provision is had for alining the machine and preventing the dropping of seed when turning the planter at the end of a row prior to recrossing the field or when moving from one place to another. The openings 24 in the seed-slides are elongated longitudinally, and more or less thereof is disclosed, according to the range of movement of the seed-slides. Hence by operating the lever 27 the quantity dropped in the hills can be regulated. When the seed-slides advance, the flap-valves open and release the grain and permit it to drop into the trenches, thereby insuring the planting of the seed at regular intervals apart.

Strips 41 are secured to the bottom of the grain-box and project beyond the rear side thereof, and their projecting ends have slots 42, in which operate pins 43, pendent from the bar 25, so as to guide the latter in its movements and limit its extreme rearward movement independent of the lever 27, thereby preventing the bar 25 from coming in contact with the axle.

Having thus described the invention, what is claimed as new is—

1. In a planter, the combination with hoppers, seed-slides for the hoppers, a bar connecting the seed-slides, and an axle provided with tappets for actuating the said bar and the slides connected therewith, of grain-spouts, means for adjusting the grain-spouts vertically, flap-valves applied to and carried by the grain-spouts and having vertical extensions to come in contact with the aforesaid bar connecting the seed-slides, and means positively and loosely connecting the vertical extensions of the flap-valves with the said bar, substantially as and for the purpose set forth.

2. In a planter, the combination with a hopper, a seed-slide, a spring for moving the seed-slide rearwardly, and an axle or rotating part provided with tappets for operating or moving the seed-slide in opposition to its actuating-spring, of a grain-spout, means for adjusting the grain-spout vertically, a flap-valve applied to the grain-spout and having a vertical extension slotted at its upper end, and a headed fastening connecting the slotted extension of the flap-valve with the seed-slide, substantially as and for the purpose specified.

3. In a planter, the combination with hoppers alining transversely, seed-slides for the hoppers, a bar connecting the seed-slides, springs connected to the hoppers and having their rear ends bent and engaging with the seed-slide-connecting bar, and pins or stops projecting from the seed-slide-connecting bar and operating in slots of the frame to limit the rearward movement of said bar and the seed-slides connected therewith, of an axle or rotating part provided with tappets to engage with the seed-slide-connecting bar, grain-spouts, means for adjusting the grain-spouts vertically, and flap-valves applied to the grain-spouts and having adjustable connection with the aforesaid seed-slide-connecting bar, substantially as set forth.

4. In a planter, the combination with a hopper, a spring-actuated seed-slide therefor, and means for reciprocating the seed-slide in the direction of motion of the machine, of a lever having a portion projecting across the path of the seed-slide, and means for securing the lever in an adjusted position, whereby the rearward movement of the seed-slide is limited, substantially as set forth.

5. In a planter, the combination of transversely-alining hoppers, seed-slides therefor, a bar connecting the seed-slides, springs normally tending to move the seed-slide-connecting bar rearwardly, a lever having a portion extending across the path of the seed-slide-connecting bar to limit its rearward movement, and means for securing said lever in an adjusted position, substantially as set forth.

6. In a planter, the combination of a hopper, a seed-slide, actuating mechanism therefor, a lever, a hooked rod having connection with the lever, a plate having a series of openings to receive the bent end of the hooked rod, and a hand-latch applied to the lever and having connection with the hooked rod, substantially as and for the purpose described.

In testimony that I claim the foregoing as my own I have hereto affixed my signature in the presence of two witnesses.

HARRISON REES.

Witnesses:
   S. B. BEATY,
   R. W. COULTER.